March 26, 1946.  M. L. FAST  2,397,414
CLUTCH
Filed Jan. 31, 1944  2 Sheets-Sheet 1
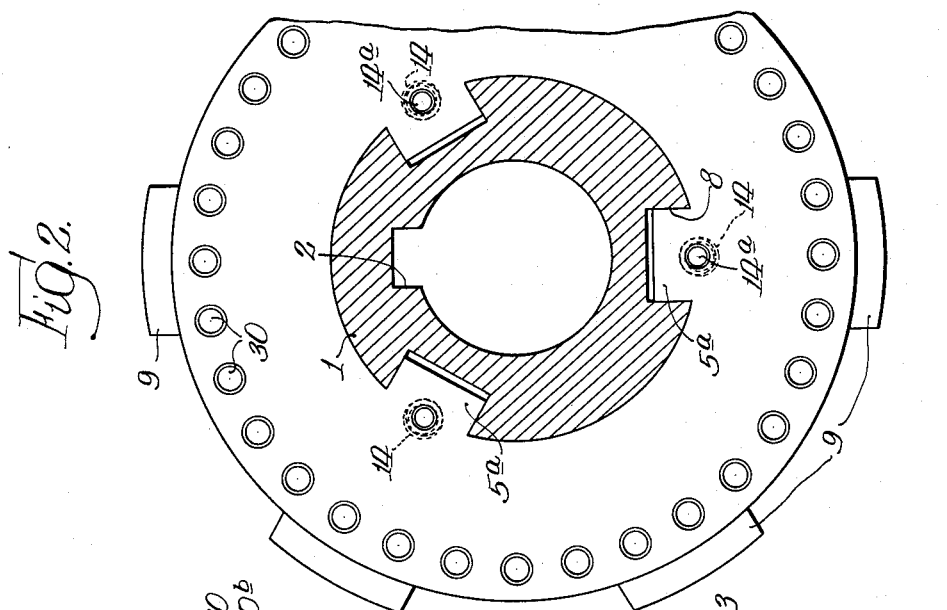
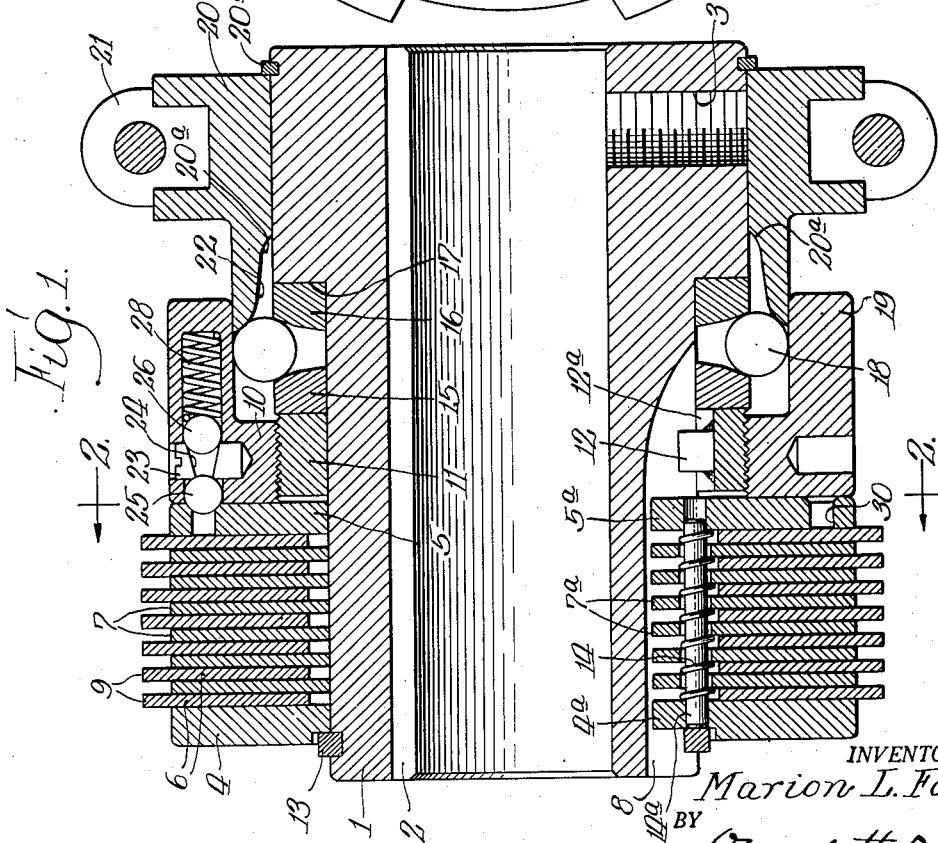
INVENTOR.
Marion L. Fast,
BY Osgood H. Dowell
Atty.

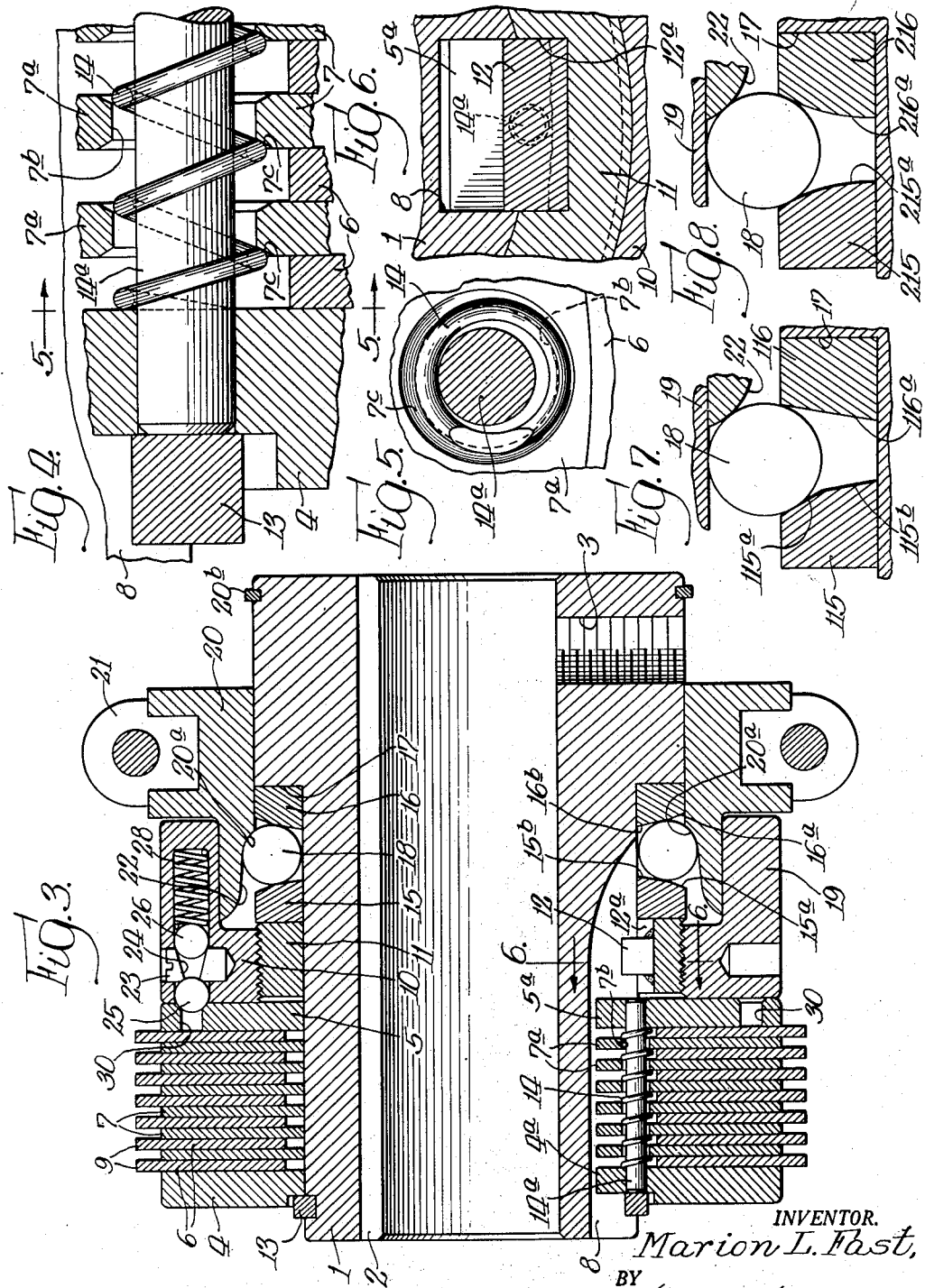

Patented Mar. 26, 1946

2,397,414

UNITED STATES PATENT OFFICE 2,397,414

CLUTCH

Marion L. Fast, South Bend, Ind., assignor to Dodge Manufacturing Corporation, Mishawaka, Ind., a corporation of Indiana Application January 31, 1944, Serial No. 520,469

4 Claims. (Cl. 192—93)

This invention relates to friction clutches, and specifically to an improved clutch of the disc-clamping type.

An object of the invention is the provision of a practicable construction suitable for a small clutch and especially one for use in a machine tool or where it must run in oil; however certain features of improvement herein described are applicable to clutches of the disc-clamping type of various specific forms and sizes and for various uses.

In the accompanying drawings, there is shown for illustration a clutch of one practicable construction embodying the several features of the present invention.

Fig. 1 is a longitudinal section of the illustrative clutch shown in released condition.

Fig. 2 is a cross-section on the line 2—2 of Fig. 1, looking in the direction of the arrows.

Fig. 3 is a partial longitudinal section of the clutch in closed or clutching condition.

Fig. 4 is an enlarged view in longitudinal section of a part of the clutch, the section being taken through one of the releasing springs shown in side elevation.

Fig. 5 is a cross section on the line 5—5 of Fig. 4, looking in the direction of the arrows and showing an end elevation of said one of the releasing springs.

Fig. 6 is a detail view showing a segment of an axially movable thrust-transmitting ring which in the illustrative clutch carries the adjusting ring.

Figs. 7 and 8 show cross sections of thrust rings of different specific forms from the thrust rings 15 and 16 of the illustrative clutch.

Referring to the drawings, the hub of the illustrative clutch is constituted by a sleeve 1 to be fixed on a shaft in driving connection therewith. The internal keyway 2 in the hub is for engagement by a driving key in engagement with a mating keyway in such shaft. The screw-hole 3 is for a set screw by which to secure the hub against longitudinal movement relative to the shaft.

Carried by the hub in driving connection therewith are plates 4 and 5 for clamping interposed friction disc means comprising in this instance discs 6 and 7 arranged in alternation. Said clamping plates 4 and 5 and discs 7 are axially movable but non-rotatable relative to the hub, being slidably fitted thereon and keyed thereto by key lugs 4ª, 5ª and 7ª extending inwardly from said plates and discs 7 and slidably fitted in angularly spaced longitudinal keyways 8 in the hub. The discs 6, arranged in alternation with the clamping plates and discs 7, are adapted to be carried by and in driving connection with a driving bell (not shown) of a pulley or other member to be connected by the clutch to the shaft on which the clutch is mounted. Said discs 6 are shown having outwardly projecting lugs 9 for slidably engaging longitudinal keyways in such driving bell.

Abutting the clamping plate 5 is an adjusting ring 10 carried by and in screw-threaded engagement with an axially movable thrust-transmitting member 11 slidably fitted on the hub but non-rotatable relative thereto, said member 11 being keyed to the hub by keys 12 rigid with said member and slidably fitted in said keyways 8 of the hub. As shown more clearly in Fig. 6, the keys 12 may be fitted in notches 12ª therefor in the member 11 and soldered in place. The other clamping plate 4 abuts an axially fixed thrust shoulder provided in this instance by a snap ring 13 (i. e. a split contractile ring) engaged in a groove therefor in the hub.

The clamping plate 5 is yieldingly urged in a direction away from the clamping plate 4 by a plurality of clutch releasing springs 14 arranged at suitably angularly spaced intervals, these being expansible coiled springs arranged between the clamping plates and under compression, the ends of the springs bearing against said plates. By the pressure of said springs the clamping plate 5 is maintained in abutting relation to the adjusting ring in the released condition of the clutch. Guide pins 14ª prevent buckling of the springs. These guide pins, fitted in holes therefor in the clamping plates, may be fixed to or fitted tightly in the holes of the plate 4 and slidable through the plate 5. Said springs 14 and guide pins 14ª pass through holes therefor in the intermediate discs 7, said holes, indicated at 7ᵇ in Figs. 4 and 5, being of slightly smaller diameter than the convolutions of the springs which are threaded through said holes and the convolutions of which bear against said discs 7; there being as many coils or convolutions of each spring as the number of intermediate discs 7 and successive convolutions of each spring bearing against the respective discs 7 at corresponding points. The springs are clear of engagement with the discs 6. As shown, the springs are arranged inwardly from the inner peripheries of the discs. The springs are threaded through the discs 7 before insertion of the guide pins 14ª, which are of smaller diameter than the inside diameter of the springs. The threading of the springs through holes in the discs 7 of smaller diameter than the outside diameter of the springs results in an eccentric relation of the springs to said holes, and a bearing of the successive spring convolutions against the successive discs 7. Said discs are preferably chamfered on both sides around said holes as indicated at 7ª in Fig. 4. With this construction, the springs 14 not only force the clamping plates apart when the pressure to effect clutching is released, but also assure spreading of the intermediate discs 7, all of said discs 7 as well as the clamping plate 5 being forced rearwardly or in a direction away from the clamping plate 4 and in a manner to spread them. This is highly advantageous to prevent sticking when the clutch is released, and especially important for a clutch operated in oil, as the oil tends to cause the discs to stick together with resultant drag after the clutch is supposed to be released.

Loosely fitted on the clutch hub behind the member 11 are a pair of hardened metal rings or washers 15 and 16, one abutting the axially movable thrust-transmitting member 11 and the other abutting an axially fixed thrust-sustaining shoulder 17 on the hub. These hardened metal rings or washers 15 and 16 have their confronting faces diverging outwardly and engaged by a plurality of steel balls 18 arranged in an annular series. There may be a full complement of such balls, in no greater number than can be forced radially inwardly to the position shown in Fig. 3; or there may be less than a full complement of balls suitably spaced by spacing means. Thus there may be as few as three balls 18, spaced approximately equal angular distances apart, though it is preferable to employ a greater number.

In the release condition of the clutch, the force of the springs 14, transmitted through the adjusting ring 10 and its axially movable carrying member 11, presses the ring 15 toward the ring 16, thus forcing the balls outwardly to a position limited in this instance by the tubular flange 19 projecting rearwardly from the adjusting ring. Slidably and rotatably fitted on the enlarged rear portion of the clutch hub is a cam sleeve 20 on which is swiveled a collar 21 which may be connected in a conventional or any suitable manner to a clutch throw lever (not shown) for reciprocating said cam sleeve. Upon forcing the cam sleeve 20 forwardly from its retracted position shown in Fig. 1, its internal cam surface 22 coacts with the balls 18 to force them inwardly, spreading the rings 15 and 16, or forcing the ring 15 away from the ring 16. The thrust thus exerted on the axially movable member 11 is transmitted through the adjusting ring 10 to the clamping plate 5, forcing it toward the plate 4 to effect clutching by the clamping of the friction discs or plates 6 and 7 between the clamping plates. Forward movement of the cam sleeve 20 may be limited by engagement with the balls 18 of a stop shoulder 20ª in the cam sleeve, and rearward movement may be limited by a stop shoulder on the hub which may be provided by a snap ring 20ᵇ engaging a groove in the hub.

A feature of the invention is the provision of the rings 15 and 16 with confronting faces having outer ball-engaging portions diverging at a greater angle than the angle of divergence of inner ball-engaging portions of said faces. For example, in the illustrative clutch the confronting faces of said rings comprise outer conical surfaces 15ª and 16ª at a relatively large slant to the vertical and inner conical surfaces 15ᵇ and 16ᵇ at a less slant to the vertical; the included angle between said outer surfaces 15ª and 16ª being for example forty degrees and the included angle between said inner surfaces 15ᵇ and 16ᵇ being only say twenty degrees. This construction allows a sufficient axial movement of the clamping plate 5 for proper clutch release, or separation of the friction clutching elements comprising the clamping plates and interposed multiple of friction discs or plates, and enables said elements to be easily forced into coaction under great pressure. In the releasing action, as the balls 18 move outward in engagement with the surfaces 15ª and 16ª, a relatively large axial movement of the clamping plate 5 takes place. Conversely, in applying or closing the clutch, as the balls are forced inwardly in engagement with the surfaces 15ª and 16ª, a relatively large axial movement is imparted to the clamping plate 5, after which the friction clutching elements are forced tightly together with large mechanical advantage by the further forcing of the balls inwardly in engagement with the surfaces 15ᵇ and 16ᵇ at relatively less slant to the vertical. The described construction of the rings 15 and 16 is also advantageous for obtaining these results in a compact organization. Such construction permits the use of smaller balls, while, on the other hand, the radial dimensions of said rings and the radial movement of the balls are much less than would be required if the confronting faces of the rings diverged at the smaller angle for their full radial extents.

The feature of the described construction of the rings 15 and 16 may be utilized in various specific forms, and the different included angles between the outer and inner portions of the confronting faces of said rings may be varied to suit either like or different requirements. For example, in Fig. 7, the rings 115 and 116 (considered as substituted for 15 and 16) have confronting faces one of which comprises concentric outer and inner conical surface 115ª and 115ᵇ and the other of which comprises a conical surface 116ª, the included angle between 115ª and 116ª being forty degrees, and the included angle between 115ᵇ and 116ª being twenty degrees. In Fig. 8, the confronting faces of the rings 215 and 216 are provided not by conical surfaces but by toric or rounded surfaces 215ª and 216ª which in cross-section are of such curvature and arrangement that the divergence of said faces increases outwardly. In place of angularly disposed lines defining cross-sections of the ring faces as in Figs. 3 and 7, such faces in cross-section may be defined by curved or arcuate lines approximately or nearly coinciding with such angularly disposed lines.

As shown in Fig. 1, in the release condition of the clutch the balls 18 bear outwardly against the flange 19 of the adjusting ring. When the cam sleeve 20 is forced forwardly from its retracted position, its wedge-like fore end enters between said flange and the balls to force them inwardly by coaction of the cam surface 22 with the balls. Said cam surface is shown formed for quickly moving the balls inwardly while in engagement with the outer portions 15ª and 16ª of the confronting faces of the rings 15 and 16, and then for effecting a more gradual inward movement of the balls.

The construction as a whole is compact, simple and practicable. The clutch is composed of parts which can be economically manufactured and assembled.

For locking the adjusting ring 10 in adjusted angular relation to the clamping plate 5, there is shown in the adjusting ring a locking means comprising a rotatable pin 23 having an eccentric annular groove 24 engaged by a pair of balls 25 and 26 arranged at opposite sides of the pin and movable transversely thereof in a bore perpendicular to the abutment face of said ring and having an open end in said face. In the clamping plate 5 are keeper holes 30 arranged in an annular series and selectively registrable with said bore. In the locking position of the locking means shown in the drawings, the pin 23 engaging the ball 25 in the shallowest part of the groove 24 holds said ball in a protracting position, protruding into engagement with a registered keeper hole while the other ball 26 is yieldingly held by the spring 28 in frictional engagement with the pin on the deepest part of said groove, thus preventing accidental turning of the pin from locking position. Upon turning the pin half way round, so that the ball 25 can be received in the deepest part of said groove, said ball can recede within the locking ring sufficiently for release of the locking means or to permit disengaging said ball 25 from the keeper hole by rotation of the adjusting ring. The locking means shown and described is the subject-matter of my co-pending patent application Serial No. 520,470.

Obviously the illustrative clutch is susceptible of modifications in details to suit different requirements and conditions; moreover it is not indispensable that all the features of the invention be used conjointly, as different features may be advantageously used in various different combinations and sub-combinations.

I claim:

1. In a friction clutch, means for exerting thrust to force the friction clutching elements into coaction comprising, in combination with an axially movable thrust-transmitting member and an axially fixed abutment, an interposed pair of adjacent rings, one axially movable and abutting said member and the other abutting said abutment, said rings having their confronting faces diverging outwardly and having said faces formed with outer portions of relatively large divergence and inner portions of substantially less divergence, an annular series of radially movable balls engaging said faces and normally in an outer position, and means for forcing said balls inwardly in engagement with said outer portions of said faces and further in engagement with said inner portions of said faces, conditions being such that forcing the balls inwardly in engagement with said outer portions of said faces effects substantial taking up of clearance between the friction clutching elements and the further forcing of the balls inwardly in engagement with said inner portions of said faces effects a tight pressing of said elements together by a comparatively short axial movement of said movable ring and consequently under relatively great mechanical advantage, the included angle between said inner portions of said faces being sufficiently large to effect outward displacement of the balls by movement of said movable ring toward the other when said means for forcing the balls inwardly is retracted.

2. In a friction clutch of the disc clamping type, the combination comprising clamping plates, an axially movable thrust-transmitting member, an adjusting ring carried by and in screw-threaded engagement with said member and having a rearwardly extending tubular flange, said adjusting ring abutting one of said clamping plates, the latter being axially movable and spring held against said adjusting ring, a pair of axially spreadable rings behind said member having confronting outwardly diverging faces, one of said rings abutting said member and the other abutting an axially fixed thrust shoulder, an annular series of radially movable balls engaging said faces, said balls being forced outward against said flange in the released condition of the clutch, and an axially movable cam sleeve having an internal cam surface coactive with said balls for forcing them inwardly to spread said rings and thereby to impose thrust on said member to effect clutching.

3. In a friction clutch of the disc clamping type, the combination comprising clamping plates, an axially movable thrust-transmitting member, an adjusting ring carried by and in threaded engagement with said member and abutting one of said plates, the latter being axially movable and spring held in contact with said adjusting ring, a pair of axially spreadable hardened metal rings behind said member having outwardly diverging confronting faces, one of said rings abutting said member and the other abutting an axially fixed thrust shoulder, an annular series of radially movable balls engaging said faces, an annular member against the interior of which said balls bear outwardly in the release condition of the clutch, and means for forcing said balls inwardly for forcing said axially movable clamping plate toward the other to effect clutching, said confronting surfaces of said rings having outer portions of relatively large divergence and inner portions of relatively small divergence but the included angle between which is large enough to effect outward displacement of the balls by movement of said one of the rings toward said other on retraction of the means for forcing said balls inwardly.

4. In a friction clutch of the disc clamping type, a hub consisting of a sleeve having external longitudinal keyways with open fore ends and having a rear portion of enlarged diameter, disc clamping plates slidable on said hub and having inwardly projecting key lugs slidably fitted in said keyways, a snap ring fitted in an annular groove therefor in the fore end of said hub and which one of said clamping plates abuts, an adjusting ring abutting the other of said plates, an axially movable thrust-transmitting member carrying said adjusting ring in screw-threaded engagement therewith, said member being slidable on said hub and having inwardly projecting keys slidably fitted in said keyways, a pair of axially spreadable rings loosely fitted on said hub behind said member, one abutting said member and the other abutting said enlarged rear portion of the hub, said rings having confronting outwardly diverging faces, an annular series of radially movable balls engaging said faces, and means controlling said balls including a cam sleeve slidable and rotatable on the enlarged rear portion of the hub and having an internal cam surface coactive with said balls for forcing them inwardly in engagement with said faces.

MARION L. FAST.